United States Patent [19]
Fischer

[11] 3,843,204
[45] Oct. 22, 1974

[54] GRAVITY AND PNEUMATIC DISCHARGE ASSEMBLY FOR HOPPER

[75] Inventor: Robert T. Fischer, Homewood, Ill.

[73] Assignee: Miner Enterprises, Inc., Chicago, Ill.

[22] Filed: Dec. 7, 1972

[21] Appl. No.: 312,871

[52] U.S. Cl. .................................. 302/52, 222/564
[51] Int. Cl. ............................................. B65g 53/46
[58] Field of Search ........... 222/193, 504, 505, 506, 222/547, 559, 564; 302/52; 214/83.28; 105/282

[56] References Cited
UNITED STATES PATENTS
1,889,562  11/1932  Moulthrod ......................... 105/282
2,950,145  8/1960  Dorey ................................. 302/52
3,445,140  5/1969  Nagy .................................. 302/52

Primary Examiner—Allen N. Knowles
Assistant Examiner—Larry Martin
Attorney, Agent, or Firm—Johnson, Dienner, Emrich, Verbeck & Wagner

[57] ABSTRACT

A hopper outlet assembly with a frame defining a discharge opening, a closure member, a hood member above the closure member and defining a plenum chamber, and restriction means closing off a portion of the plenum chamber whereby to constrict the flow of lading therethrough.

7 Claims, 6 Drawing Figures

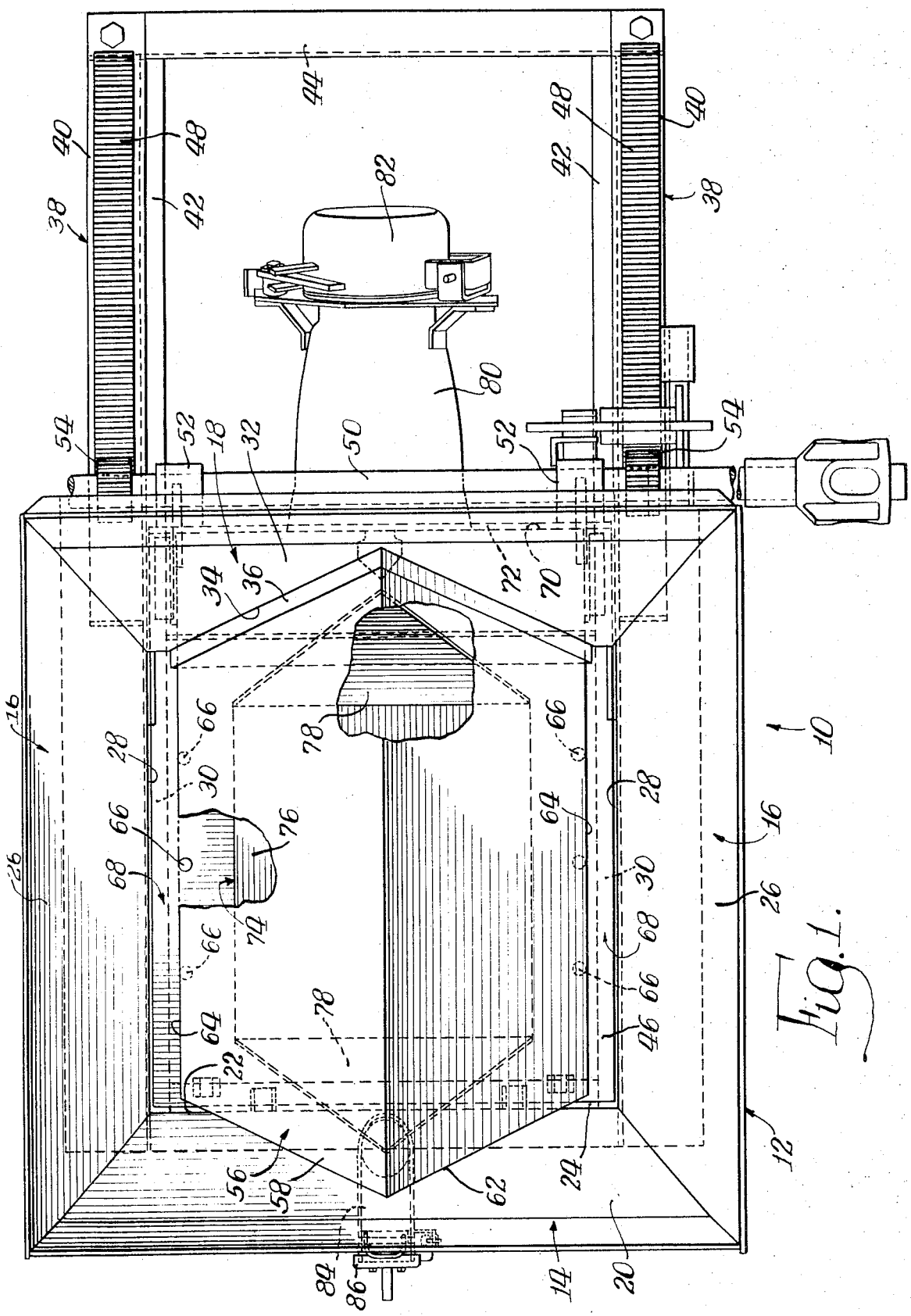

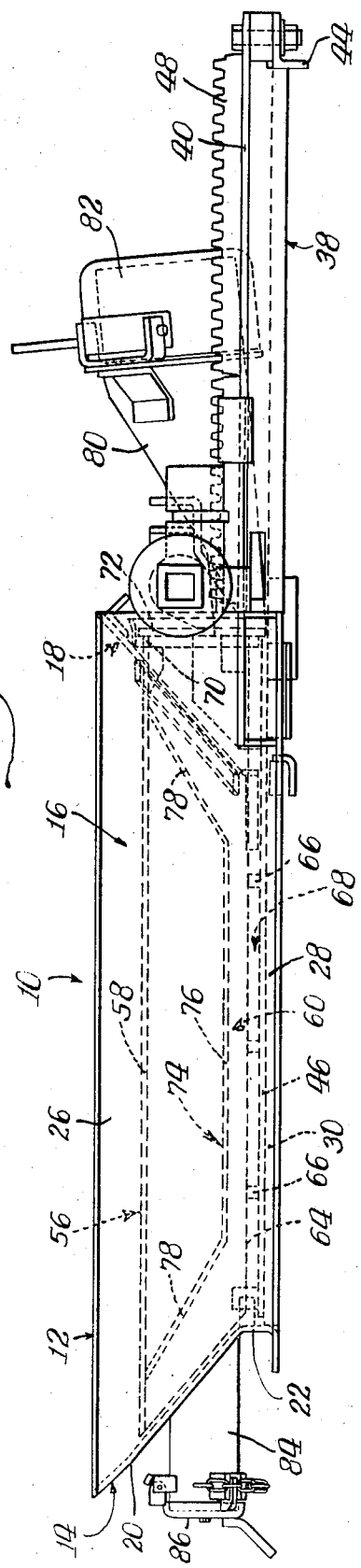
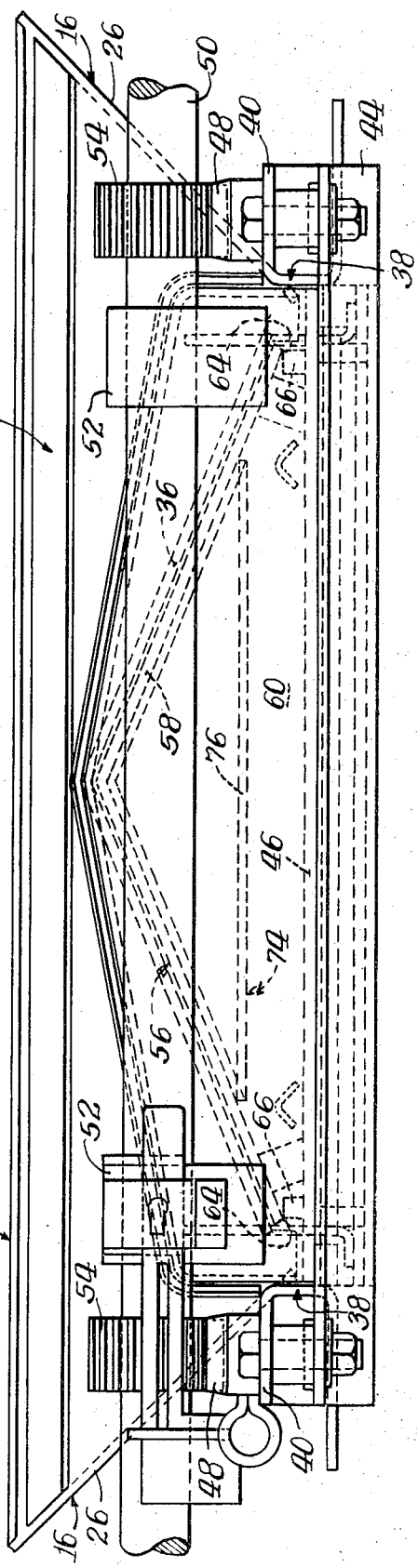

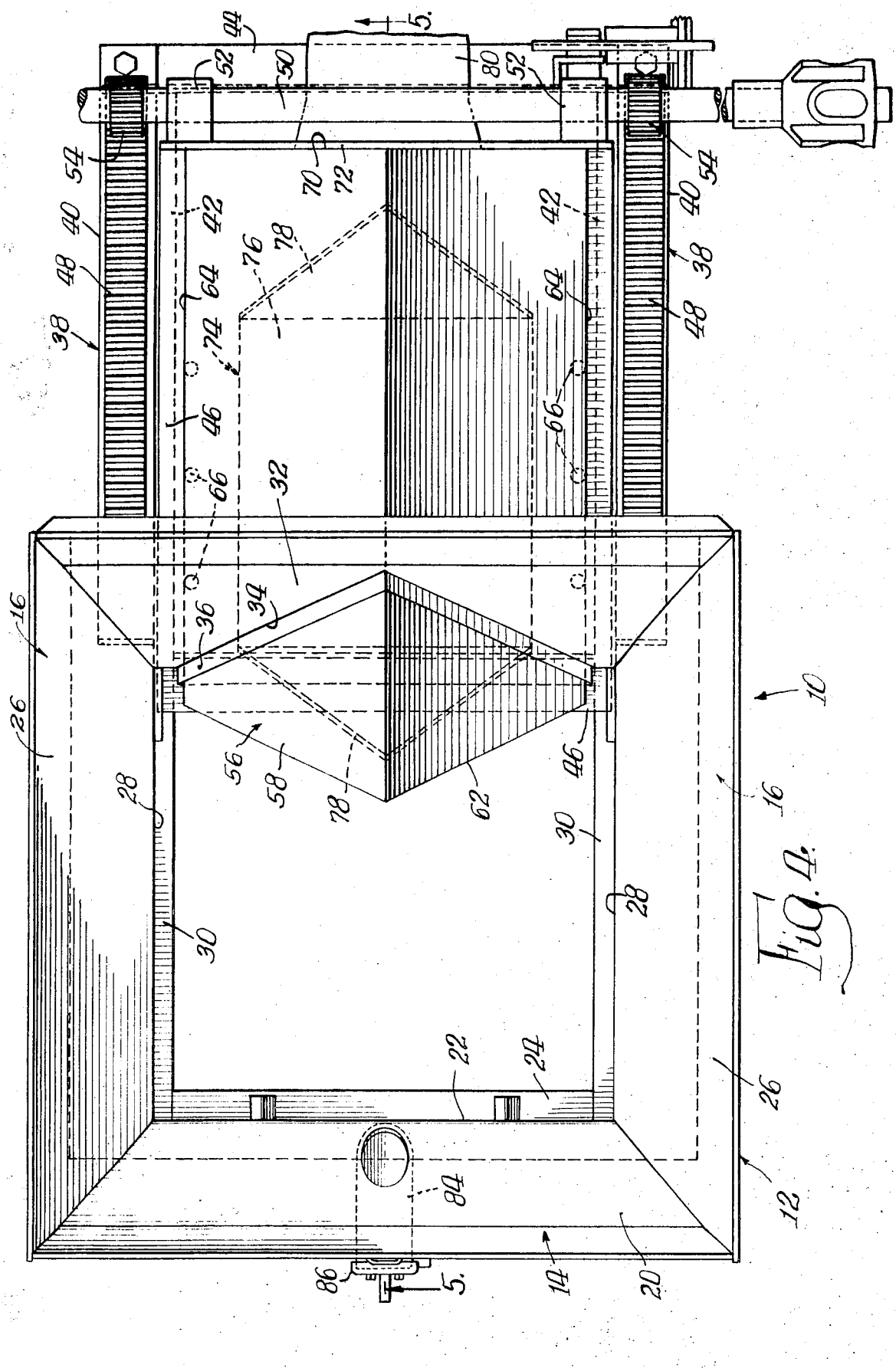

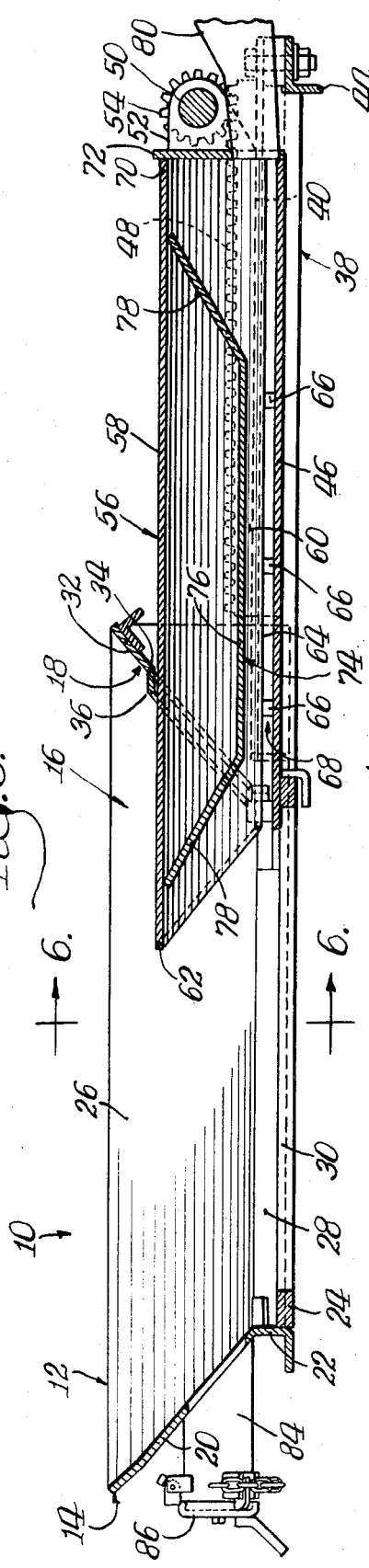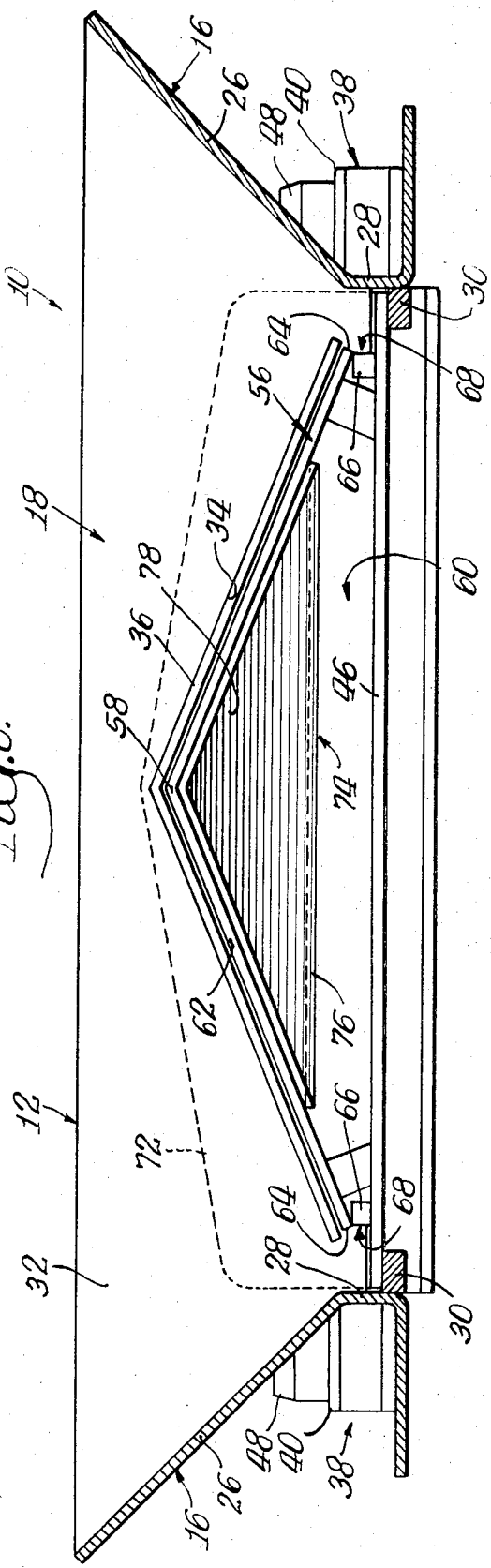

GRAVITY AND PNEUMATIC DISCHARGE ASSEMBLY FOR HOPPER

FIELD OF THE INVENTION

The present invention pertains generally to hopper outlet assemblies, which are adapted for use in connection with railroad hopper cars, and through which lading, such as finely comminuted or granulated commodities in bulk, is adapted to be discharged from the car either pneumatically or by gravity.

SUMMARY OF THE INVENTION

The hopper outlet assembly of the present invention includes a main frame which is adapted to be attached to a hopper bottom and which defines a discharge opening normally closed by a horizontal closure member. A hood member above the closure member defines therewith a plenum chamber through which lading may flow, and pneumatic conduit means serves to accommodate the pneumatic or vacuum discharge of lading from the plenum chamber. A portion of the plenum chamber is closed off by restriction means which serves to constrict, and hence improve, the flow of lading therethrough.

BRIEF DESCRIPTION OF THE DRAWINGS

FIG. 1 is a plan view, with portions being broken away, of a hopper outlet assembly embodying the principles of the present invention;

FIG. 2 is a side elevational view of the hopper outlet assembly of FIG. 1;

FIG. 3 is an end elevational view of the hopper outlet assembly of FIG. 1, with the outlet conduit section removed;

FIG. 4 is a plan view corresponding generally to FIG. 1, and shows the gate and hood unit in open position;

FIG. 5 is a longitudinal sectional view taken substantially along the line 5—5 in FIG. 4 looking in the direction indicated by the arrows; and FIG. 6 is a transverse sectional view taken substantially along the line 6—6 in FIG. 5 looking in the direction indicated by the arrows.

DESCRIPTION OF THE PREFERRED EMBODIMENT

Referring now to the drawings, there is indicated generally by the reference numeral 10 a hopper outlet assembly which, as will be understood by those skilled in the art, is adapted to be arranged at the lower end of a conventional hopper section of a railroad hopper car.

The hopper outlet assembly 10 is comprised of a generally horizontally disposed rectangular main frame 12 having a front frame section 14, side frame sections 16, and a rear frame section 18. The front frame section 14 includes an upper sloping wall portion 20, a vertical wall portion 22, and a lower inwardly directed flange portion 24. Similarly the side frame sections 16 each includes an upper sloping wall portion 26, a vertical wall portion or border 28, and a lower inwardly directed flange portion 30. The rear frame section 18 includes an upper sloping wall portion 32 with an inverted V-shaped cut-out 34 along which is secured a projecting cover strip 36. The sloping wall portions 20, 26 and 32 are adapted to be suitably secured, as by welding, to the lower portion of a hopper, and the main frame 12 defines a discharge opening, with parallel horizontal side borders, through which lading can flow by gravity from the hopper.

Projecting away from the side frame sections 16 in parallel relationship are extension assemblies 38 which have upper outwardly directed flange portions 40 and lower inwardly directed flange portions 42 in alignment with the flange portions 30 of the side frame sections 16. The rear ends of the extension assemblies 38 are interconnected by a transverse angle bar 44.

A horizontal closure member or gate 46 is slidable along the flange portions 30 and 42 between a first position across the discharge opening to close the same and a second position away from the discharge opening. In this connection, the flange portion 24 of the front frame section 14 serves to support the front edge of the gate 46 when the latter is in its closed position.

Means for operating the gate 46 includes a pair of rack members 48 which are secured to the upper flange portions 40 of the extension assemblies 38. Located above the rack members 48 is a transverse operating shaft 50 rotatably journaled in brackets 52 having connection with the trailing edge of the gate 46. A pair of pinion gears 54 are secured on the operating shaft 50 and have meshing engagement with the rack members 48. Rotation of the operating shaft 50 and pinion gears 54 serves to effect movement of the gate 46 between its closed and open positions.

Mounted above, and movable with, the gate 46 is a hood unit 56 which includes an inverted V-shaped hood member 58 extending lengthwise of the main frame 12 and defining with the gate 46 a plenum chamber 60 into which lading may flow. The front edge or border 62 of the hood member 58 is normally spaced from the sloping wall portion 20 of the front frame section 14 to provide an opening through which lading may flow into the plenum chamber 60. The size of this opening can be varied slightly, by moving the gate 46 forward or backward, for accommodating efficient lading cleanout. The parallel horizontal side edges or borders 64 of the hood member 58 are supported on support members 66 secured to the gate 46, and are spaced both from the side borders 28 of the side frame sections 16 and from the gate 46 to define elongated openings 68 through which lading may flow into the plenum chamber 60. The rear edge 70 of the hood member 58 has secured thereto a rear wall 72 which extends downwardly to the gate 46. Disposed within the plenum chamber 60 is restriction means in the form of a restrictor plate 74 which comprises a horizontal base portion 76 and upwardly inclined end portions 78, and which is secured along its edges to the underside of the hood member 58.

Secured in the rear wall 72 of the hood unit 56, and communicating with the plenum chamber 60, is an outlet conduit section 80 which is adapted to be connected to a pneumatic or vacuum system in a known manner. The outer end of the conduit section 80 is provided with a conventional cap 82 for closing the same and sealing the plenum chamber 60 when the latter is not in use. Secured in the front frame section 14, and communicating with the plenum chamber 60, is an auxiliary air inlet conduit section 84 provided with a conventional cap 86 which may be opened as and to the extent desired to permit secondary air to enter into the plenum chamber 60.

When pneumatic or vacuum discharge of lading is desired, the gate 46 and the hood unit 56 are disposed in the position shown in the drawings, the cap 82 is opened, and a vacuum hose (not shown) is attached to the conduit section 80. Upon activation of the penumatic or vacuum source, lading within the hopper flows down through the opening along the front border 62 of the hood member 58 and through the elongated side openings 68 into the plenum chamber 60, and is entrained in the air of the system in a conventional manner for discharge of the same from the plenum chamber 60 through the outlet conduit section 80. During vacuum discharge, the restrictor plate 74 serves to close off a portion of the plenum chamber 60 and thereby constricts the flow of lading therethrough. As a consequence, there is produced a venturi-like effect which improves the pick-up and flow of lading during vacuum discharge.

When gravity discharge is desired, the operating shaft 50 is rotated to move the gate 46 and hood unit 56 away from the discharge opening. After the lading has been discharged by gravity in a conventional manner, the operating shaft 50 is rotated to return the gate 46 and hood unit 56 to the position shown in the drawings across the discharge opening.

While there has been shown and described a preferred embodiment of the present invention, it will be understood by those skilled in the art that various modifications and rearrangements may be made therein without departing from the spirit and scope of the invention.

The invention claimed is:

1. In a hopper outlet assembly, the combination of a main frame comprised of a front frame section and side frame sections and a rear frame section, said main frame adapted to be attached to a hopper bottom and defining a discharge opening with parallel horizontal side borders, a horizontal closure member normally closing said discharge opening, a hood unit including a hood member extending lengthwise of said main frame above said closure member and defining therewith a plenum chamber into which lading may flow, outlet conduit means communicating with said plenum chamber, and restriction means completely closing off a portion of said plenum chamber from air and lading whereby to constrict the flow of lading through the remaining portion of said plenum chamber.

2. The combination of claim 1 wherein said hood member is of inverted V-shape and has parallel horizontal side borders, and said side borders of said hood member are spaced from said side borders of said main frame and are spaced from said closure member to define elongated openings through which lading may flow into said plenum chamber.

3. The combination of claim 2 wherein said restriction means comprises a restrictor plate secured along all of its edges to the underside of said hood member.

4. The combination of claim 3 wherein said restrictor plate includes a horizontal base portion and opposed upwardly inclined end portions.

5. The combination of claim 4 wherein said side borders of said hood member are supported on support members secured to said closure member, said hood member has a front border normally spaced from said front frame section, said hood unit has a rear wall extending downwardly to said closure member, and said outlet conduit means is secured in said rear wall of said hood unit.

6. The combination of claim 5 including auxiliary air inlet conduit means secured in said front frame section of said main frame for communication with said plenum chamber.

7. The combination of claim 6 including means for moving said closure member and said hood unit away from said discharge opening.

* * * * *